April 17, 1962
C. J. DANIELS
3,030,078
AERIAL CARGO DELIVERY SYSTEM
Original Filed Aug. 8, 1956
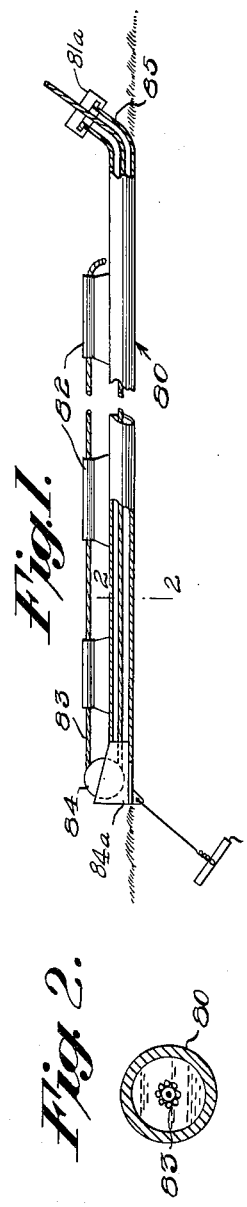
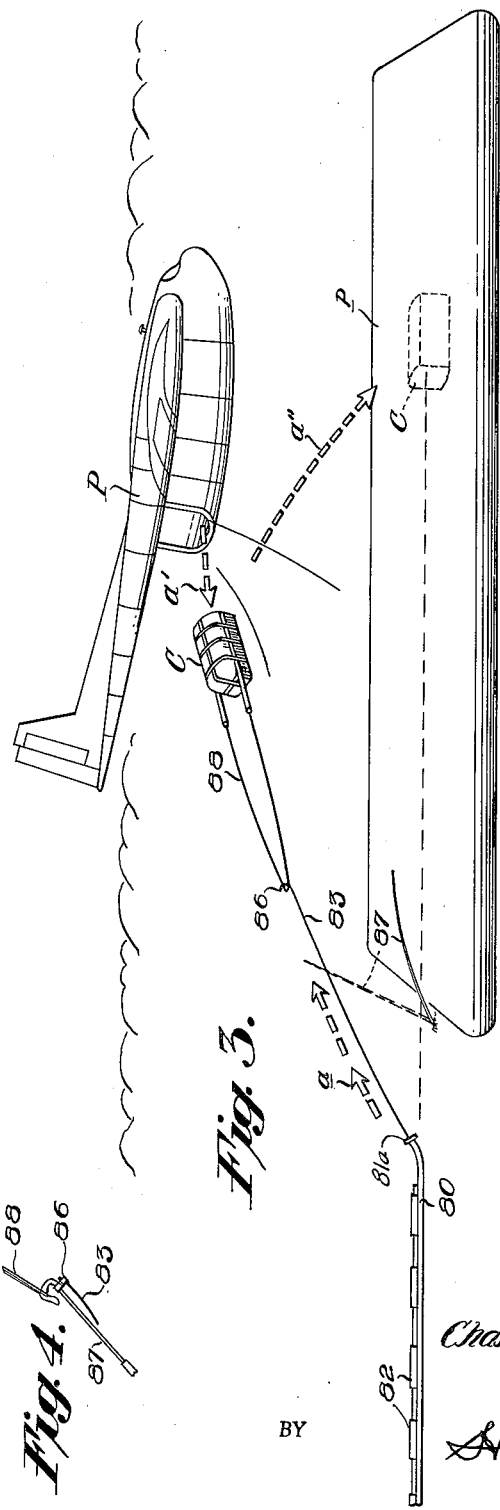
INVENTOR
*Charles J Daniels*
BY *Herbert M Birch*
ATTORNEY

United States Patent Office 3,030,078
Patented Apr. 17, 1962

3,030,078
AERIAL CARGO DELIVERY SYSTEM
Charles J. Daniels, Wilmington, Del., assignor to All American Engineering Company, Wilmington, Del., a corporation of Delaware
Original application Aug. 8, 1956, Ser. No. 602,860. Divided and this application Feb. 5, 1960, Ser. No. 7,059
5 Claims. (Cl. 258—1.2)

This invention relates to means for decelerating moving objects and is a division of my co-pending application Serial Number 602,860, filed August 8, 1956, now abandoned.

The invention is more particularly concerned with arresting cargo or other objects from aircraft in flight, said arresting means being characterized by an elongated tube having a fluid therein, together with a trailing cable movable axially of the tube under action of a moving object and wherein a motion arresting force is provided by skin friction between the cable and fluid upon relative movement thereof, in the tube to decelerate the cargo or other objects arrested.

An object of the invention is the provision of an elongated tube having a fluid therein and a trailing cable movably disposed within the tube and wherein the tube if desired may be of a flexible character adapting it to be readily stored or transported to and from positions of use.

A further object is to provide an aerial delivery system using the present arresting gear arrangement.

Other objects and advantages of the invention will become apparent in the course of the following detailed description taken in connection with the accompanying drawings, wherein:

FIGURE 1 is a broken longitudinal view of a tube which may be flexible and foldable when empty and a cable structure, shown partly in elevation and partly in vertical section and adapted for use in an aerial delivery system under the arresting principles of the invention.

FIGURE 2 is an enlarged transverse sectional view as observed in the plane of line 2—2 of FIGURE 1.

FIGURE 3 is a more or less schematic perspective view of a delivery system embodying the principles of the invention.

FIGURE 4 is a fragmental view of a pole and a cargo engageable hook thereon.

The present arresting mechanism is useful for the delivery of objects by aircraft in flight. For example, FIGURE 3 illustrates the delivery of cargo from a moving plane in cooperation with one of the present novel arresting means.

The structure involved in the cargo delivery system includes a cable 83 extending through a fluid filled tube 80, which may be of flexible hose-like form, whereby it is adapted to be folded or rolled into compact form for transportation or storage when not in use.

The tube 80 is adapted to be freely spread on the ground and at the rear, aft or retrieving end thereof the tube is provided with an anchor 81 and at the front or arrest end thereof the same is closed by an end seal cap 81a having an opening therein for the cable 83. The tube 80 is provided with a plurality of longitudinally spaced arrest cable guides or holders 82 and the arresting cable 83 extends through the tube 80 from the forward end thereof, around a pulley 84 suitably journalled in the side walls of an open liquid supply sump 84a at the rear or aft end of the tube and through the plurality of guides 82, with the retrieve or tail end thereof normally extending beyond the foremost guide 82 as is clearly indicated in FIGURE 1. The forward end of the tube 80 is molded or formed with an upwardly curved portion 85 for upward inclination of the arresting cable 83, whose free end is provided with a hook 86, see FIGURE 4, which is normally engaged with the upper end of a pole 87, in a manner disclosed in Patent No. 2,692,120.

A cargo delivery operation is illustrated in FIGURE 3, wherein cargo C is being delivered from the storage compartment of a cargo plane P and in order to protect the cargo on delivery a flex-decking pad p is supported on the ground at a delivery station and beyond the pole 87. The cargo C is provided with an elongated loop 88 normally depending from the cargo plane P and which engages the hook 86 to which the arresting cable 83 is attached. Thus, upon engagement of the loop 88 with the arresting cable hook 86, the cargo C is immediately subjected to the arresting action of the structure in FIGURE 1 with a resulting rapid deceleration of the cargo as it is withdrawn from the plane, and the cargo eventually comes to rest on the pad p, see the dotted representations of FIGURE 3.

As indicated in FIGURE 3 the arresting cable 83 is extended in the direction of arrow a and upon initial engagement of the loop 88 and the arresting cable hook 86 the cargo C is withdrawn from the plane P in the direction of arrow a' and the cargo in its decelerating movement takes the general course of the arrow a". As the weight of the cargo C is imparted to the arresting cable 83, the arrest cable extends in the direction of arrow a and while being so extended absorbs energy as the cable in the tube 80 is pulled forward through the liquid in the tube, to thereby develop an energy absorbing force which increases upon increased relative movement of the trailing portion of the cable in the fluid within the tube 80.

Without further description it is believed that the present invention is clearly understandable to others authorized to practice the same. While only one embodiment of the invention is described and illustrated in detail, it is to be expressly understood that other combinations, modifications and arrangements of the parts which will now probably occur to others skilled in the art are to be considered a part hereof. To determine the scope of the present invention, reference should be had to the appended claims.

What I claim is:
1. Means for delivering cargo having a hook engageable loop from an aircraft in flight, said means comprising an elongated conduit of flexible hose-like form having liquid therein, a cable having a free trailing end movably disposed in said conduit and which upon movement relative to the liquid therein sets up an energy absorbing force which increases upon increased relative movement of the cable in the liquid in the conduit, a hook secured to the forward end of said cable, a pole releasably supporting said hook, said pole being mounted at the forward end of the conduit, said hook extending upwardly from the pole at an angle and forwardly from the front end of said tube for engagement with said cargo loop.

2. Means for delivering cargo having a hook engageable loop from an aircraft in flight, said means comprising an elongated conduit of flexible hose-like form having liquid therein, a cable having a free trailing end movably disposed in said conduit and which upon movement relative to the liquid therein sets up an energy absorbing force which increases upon increased relative movement of the cable in the liquid in the conduit, a hook secured to the forward end of the said cable, a pole releasably supporting said hook, said pole being mounted at the forward end of the conduit, said hook extending upwardly from the pole at an angle and forwardly from the front end of said tube for engagement with said cargo loop, and a pad positioned forwardly and below the plane of the said hook, said pad receiving the cargo when withdrawn from a moving plane by said hook.

3. Means for delivering cargo having a hook engageable loop from an aircraft in flight, said means comprising an elongated conduit having liquid therein, a cable having a free trailing end movably disposed in said conduit and which upon movement relative to the liquid therein sets up an energy absorbing force which increases upon increased relative movement of the cable and the liquid in the conduit, a hook secured to the forward end of said cable, a pole releasably supporting said hook, said pole being mounted at the forward end of the conduit, said hook extending upwardly from the pole at an angle and forwardly from the front end of said tube for engagement with said cargo loop, said conduit being of flexible hose-like form, a pulley at one end of the conduit, a plurality of cable guides projecting upwardly from the conduit, and said cable extending through said conduit, over said pulley and through said guides with a free end normally therebeyond in the provision of a cable retrieve end.

4. Means for delivering cargo having a hook engageable loop from an aircraft in flight, said means comprising an elongated conduit of flexible hose-like form having liquid therein, a cable having a free trailing end movably disposed in said conduit and which upon movement relative to the liquid therein sets up an energy absorbing force which increases upon increased relative movement of the cable and the liquid in the conduit, a hook secured to the forward end of said cable, a pole releasably supporting said hook, said pole being mounted at the forward end of the conduit, said hook extending upwardly from the pole at an angle and forwardly from the front end of said tube for engagement with said cargo loop, said conduit at the forward end thereof being inclined upwardly, and a seal cap over the end of said forward end, said seal having an opening for the pay out of the arrest cable.

5. Means for ground delivery of cargo from an aircraft in flight, said cargo having means carried thereby engageable with a ground based energy absorber, said energy absorber comprising a cable with an elongated trailing portion in a liquid, said liquid being confined in an elongated member, said cable when pulled upon by the momentum of the cargo imparting movement to the said cable trailing portion and displacement of the liquid in said member, thereby setting up an energy absorbing force, said energy absorbing force increasing upon the increased relative movement of the cable trailing portion in the liquid, means secured to the forward end of said cable adapted to become engaged with said means carried by the cargo, whereby upon such engagement the cargo is withdrawn without appreciable shock from said aircraft to the ground by said ground based energy absorber.

References Cited in the file of this patent

UNITED STATES PATENTS

| | | |
|---|---|---|
| 2,250,153 | Cooper | July 22, 1941 |
| 2,282,921 | Adams | May 12, 1942 |
| 2,360,495 | Hill | Oct. 17, 1944 |
| 2,777,653 | Cotton et al. | Jan. 15, 1957 |